(12) United States Patent
Kojima

(10) Patent No.: US 11,654,509 B2
(45) Date of Patent: *May 23, 2023

(54) PROCESSING APPARATUS

(71) Applicant: DISCO CORPORATION, Tokyo (JP)

(72) Inventor: Yoshimasa Kojima, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 17/337,534

(22) Filed: Jun. 3, 2021

(65) Prior Publication Data

US 2021/0402511 A1 Dec. 30, 2021

(30) Foreign Application Priority Data

Jun. 29, 2020 (JP) .............................. JP2020-111521

(51) Int. Cl.
*B23K 26/03* (2006.01)
*B23K 26/08* (2014.01)
(Continued)

(52) U.S. Cl.
CPC .......... *B23K 26/03* (2013.01); *B23K 26/0853* (2013.01); *B23K 26/364* (2015.10); *B23K 2101/40* (2018.08)

(58) Field of Classification Search
CPC ................ B23K 26/03; B23K 26/0853; B23K 26/364; B23K 2101/40; B23K 26/0622;
(Continued)

(56) References Cited

U.S. PATENT DOCUMENTS

2015/0116412 A1* 4/2015 Duke .................. B41J 3/60
347/19
2019/0035689 A1* 1/2019 Yamamoto ........ H01L 21/67265
(Continued)

FOREIGN PATENT DOCUMENTS

JP     2006140341 A     6/2006
JP     2010087141 A  *   4/2010
(Continued)

OTHER PUBLICATIONS

Office action issued in corresponding Singapore patent application No. 10202106106U, dated Apr. 25, 2022.

*Primary Examiner* — Helena Kosanovic
*Assistant Examiner* — Yi Hao
(74) *Attorney, Agent, or Firm* — Greer, Burns & Crain, Ltd.

(57) ABSTRACT

A processing apparatus includes a first imaging unit over a chuck table that images a back surface side of a workpiece, a second imaging unit under the chuck table that images a front surface side of the workpiece in a region corresponding to a region imaged by the first imaging unit, and a control part that inverts, in a predetermined direction, either a first image obtained by imaging of a processed groove on the back surface side by the first imaging unit or a second image obtained by imaging of the processed groove on the front surface side by the second imaging unit in such a manner that orientations of the first and second images correspond with each other, and that causes a display device to display both the processed groove in the first image and the processed groove in the second image that are superimposed.

6 Claims, 12 Drawing Sheets

(51) Int. Cl.
*B23K 26/364* (2014.01)
*B23K 101/40* (2006.01)

(58) Field of Classification Search
CPC ............... B23K 26/402; B23K 26/032; B23K 2103/52; B23K 2103/54; B28D 5/02; B28D 5/0058; B28D 5/0082; B28D 5/022; H01L 21/67092; H01L 21/67259; H01L 21/681; H01L 21/68714
See application file for complete search history.

(56) References Cited

U.S. PATENT DOCUMENTS

2021/0210375 A1* 7/2021 Kojima ................ B23K 26/083
2021/0242061 A1* 8/2021 Kojima .................... H04N 7/18

FOREIGN PATENT DOCUMENTS

| JP | 2010087141 A | 4/2010 |
|---|---|---|
| JP | 2021125519 A | 8/2021 |

* cited by examiner

PROCESSING APPARATUS

BACKGROUND OF THE INVENTION

Field of the Invention

The present invention relates to a processing apparatus that processes a back surface side of a workpiece on which devices are formed on the front surface side in a state in which the front surface side of the workpiece is held.

Description of the Related Art

Semiconductor device chips used for pieces of electrical equipment such as mobile phones and personal computers are manufactured by processing a wafer (workpiece) that is formed of a semiconductor material such as silicon and has a circular disc shape, for example. Plural planned dividing lines are set in a front surface of the workpiece, and a device such as an integrated circuit (IC), large scale integration (LSI), or micro electro mechanical systems (MEMS) is formed in each of regions marked out by the plural planned dividing lines. To manufacture the device chips from the workpiece, for example, the workpiece is thinned to a predetermined thickness by grinding the back surface side of the workpiece. Thereafter, the workpiece is cut along each planned dividing line to divide the workpiece in units of device. Thus, the device chips are manufactured.

In a cutting step of cutting the workpiece, a cutting apparatus including a cutting unit in which a cutting blade is mounted on one end of a spindle and a chuck table that holds the workpiece under suction is used. In a normal cutting step, first, the front surface side of the workpiece is set upward, and the back surface side of the workpiece is held under suction by the chuck table. After the back surface side is held, alignment is executed by imaging the front surface side of the workpiece by a first camera disposed over the chuck table. The first camera has an imaging element such as a charge-coupled device (CCD) image sensor or a complementary metal-oxide-semiconductor (CMOS) image sensor for imaging a subject by visible light.

Alignment of position correction and so forth of the workpiece is executed based on a result of imaging of the front surface side of the workpiece on which an alignment mark or the like is formed by the first camera. After the alignment, the workpiece is cut along each planned dividing line by the cutting blade. However, in recent years, in association with diversification of devices, there have been cases in which a workpiece is cut from the back surface side of the workpiece (for example, refer to Japanese Patent Laid-Open No. 2006-140341). In this case, the front surface side of the workpiece is disposed downward and is held by a chuck table. Therefore, it is impossible to image an alignment mark or the like when the back surface side of the workpiece is imaged by the first camera disposed over the chuck table.

Thus, a cutting apparatus including a chuck table formed of a material that is transparent to visible light and a second camera for visible light disposed under the chuck table has been developed (for example, refer to Japanese Patent Laid-Open No. 2010-87141). When the chuck table formed of the material that is transparent to visible light is used, the front surface side of a workpiece can be imaged from the lower side of the chuck table in the state in which the front surface side of the workpiece is held by the chuck table. Incidentally, in recent years, there have been many opportunities of cutting, with a cutting blade, a comparatively-hard semiconductor substrate (for example, silicon carbide (SiC) substrate) used for semiconductor chips for power devices. In this case, there is concern about the lowering of the processing accuracy due to the occurrence of the situation in which a cut groove is formed obliquely with respect to the thickness direction of the substrate or is formed in a tapered manner.

SUMMARY OF THE INVENTION

Thus, it is desired to check how the cut groove is formed in order to check the processing accuracy. However, with the above-described existing cutting apparatus, only checking an image of the front surface side of the workpiece and an image of the back surface side separately regarding each is possible. For this reason, under the present circumstances, an operator visually inspects a processed groove by using a microscope or the like after the cut groove is formed. However, in the case of executing the visual inspection, the work efficiency lowers because the work time of the visual inspection is required additionally after the formation of the cut groove. The present invention is made in view of such a problem and intends to provide a processing apparatus that allows an operator to check the processing accuracy of a cut groove on the processing apparatus.

In accordance with an aspect of the present invention, there is provided a processing apparatus that processes a plate-shaped workpiece in which a device is disposed in each of a plurality of regions marked out by a plurality of planned dividing lines set in a front surface of the workpiece in a state in which a side of the front surface of the workpiece is held. The processing apparatus includes a chuck table that includes one surface and the other surface located on an opposite side to the one surface, has a plate-shaped holding component having a predetermined region formed of a transparent material from the one surface to the other surface, and holds the side of the front surface of the workpiece, a processing unit that processes the workpiece for which the front surface is held by the chuck table and forms processed grooves in the workpiece, and a first imaging unit that has a first imaging element, is disposed over the chuck table, and images a side of a back surface of the workpiece held by the chuck table. The processing apparatus also includes a second imaging unit that has a second imaging element, is disposed under the chuck table, and images, through the holding component, the side of the front surface of the workpiece in a region corresponding to a region imaged by the first imaging unit in a thickness direction of the workpiece, a display device that displays an image of the workpiece acquired by at least either the first imaging unit or the second imaging unit, and a control part that has a storing device in which a program to execute image processing is stored and a processing device that processes an image in accordance with the program. The control part inverts, in a predetermined direction, either a first image obtained by imaging of the processed groove formed on the side of the back surface by the first imaging unit or a second image obtained by imaging of the processed groove formed on the side of the front surface by the second imaging unit in such a manner that orientations of the first image and the second image correspond with each other. The control part causes the display device to display both the processed groove in the first image and the processed groove in the second image in a state in which the first image and the second image are superimposed.

The control part of the processing apparatus according to the aspect of the present invention inverts, in the predetermined direction, either the first image obtained by imaging of the processed groove formed on the back surface side by the first imaging unit or the second image obtained by imaging of the processed groove formed on the front surface side by the second imaging unit in such a manner that the orientations of the first image and the second image correspond with each other. Further, the control part causes the display device to display both the processed groove in the first image and the processed groove in the second image in the state in which the first image and the second image are superimposed. Therefore, the operator can check the processing accuracy of the processed groove by checking the position of the processed groove on the back surface side and the position of the processed groove on the front surface side in the image displayed on the display device. Accordingly, there is no need to convey the workpiece from the processing apparatus to a microscope and visually inspect the workpiece by the microscope. Further, because the processing accuracy can be checked on the processing apparatus, the work efficiency can be improved compared with the case in which visual inspection is executed.

The above and other objects, features and advantages of the present invention and the manner of realizing them will become more apparent, and the invention itself will best be understood from a study of the following description and an appended claim with reference to the attached drawings showing some preferred embodiments of the invention.

DETAILED DESCRIPTION OF THE PREFERRED EMBODIMENTS

Figure 1:
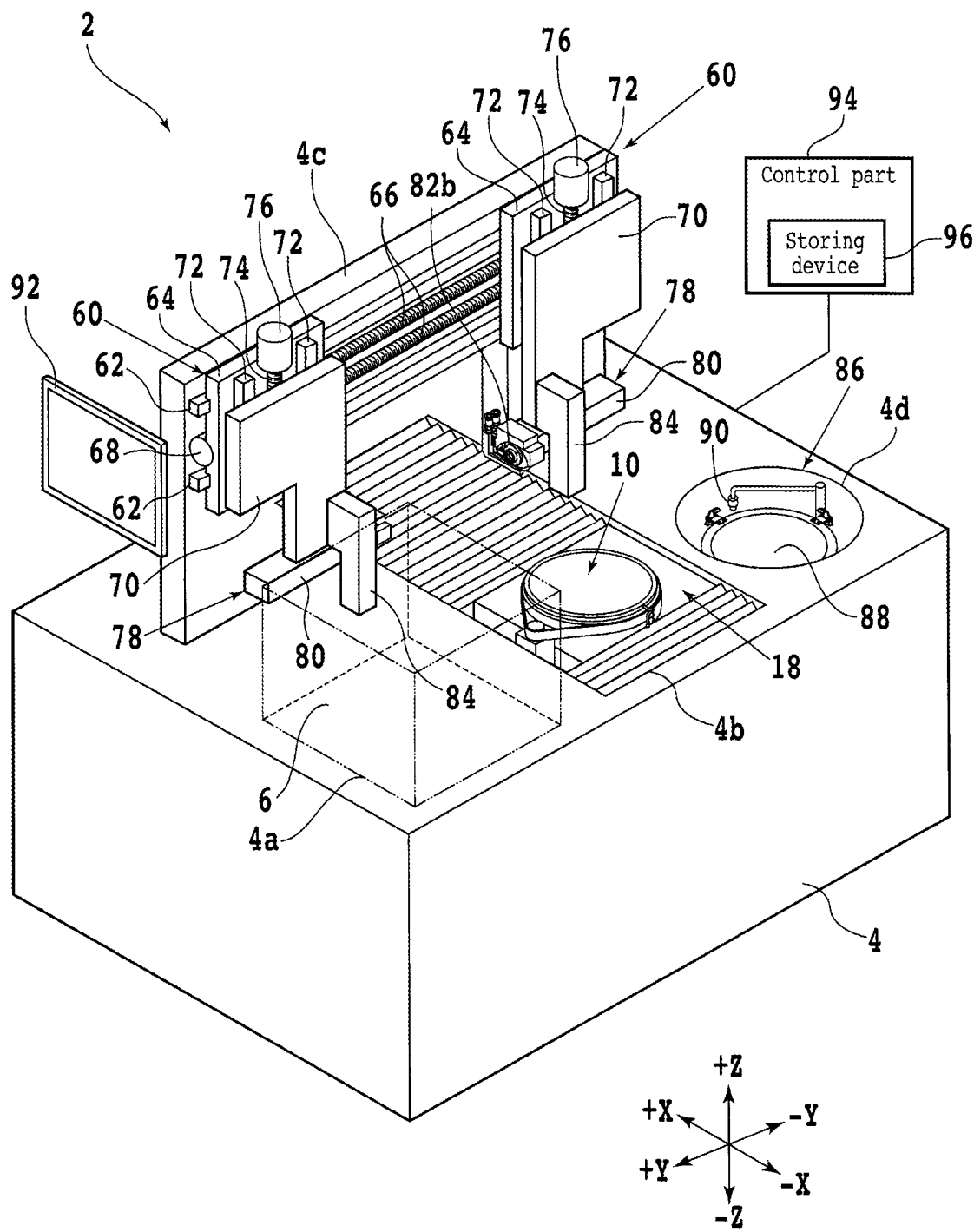
FIG. 1 is a perspective view of a cutting apparatus.

Embodiments according to an aspect of the present invention will be described with reference to the accompanying drawings. FIG. 1 is a perspective view of a cutting apparatus (processing apparatus) 2 according to a first embodiment. In FIG. 1, part of constituents is illustrated as a functional block diagram. Further, an X-axis direction (processing feed direction), a Y-axis direction (indexing feed direction), and a Z-axis direction (vertical direction, cutting-in feed direction) that are used for the following explanation are perpendicular to each other. The cutting apparatus 2 includes a base 4 that supports the respective constituents. An opening 4a is formed at a corner part on the front side (+Y direction) of the base 4, and a cassette elevator (not illustrated) is disposed in the opening 4a. A cassette 6 for housing plural workpieces 11 (see FIG. 2) is placed on the upper surface of the cassette elevator.

Figure 2:
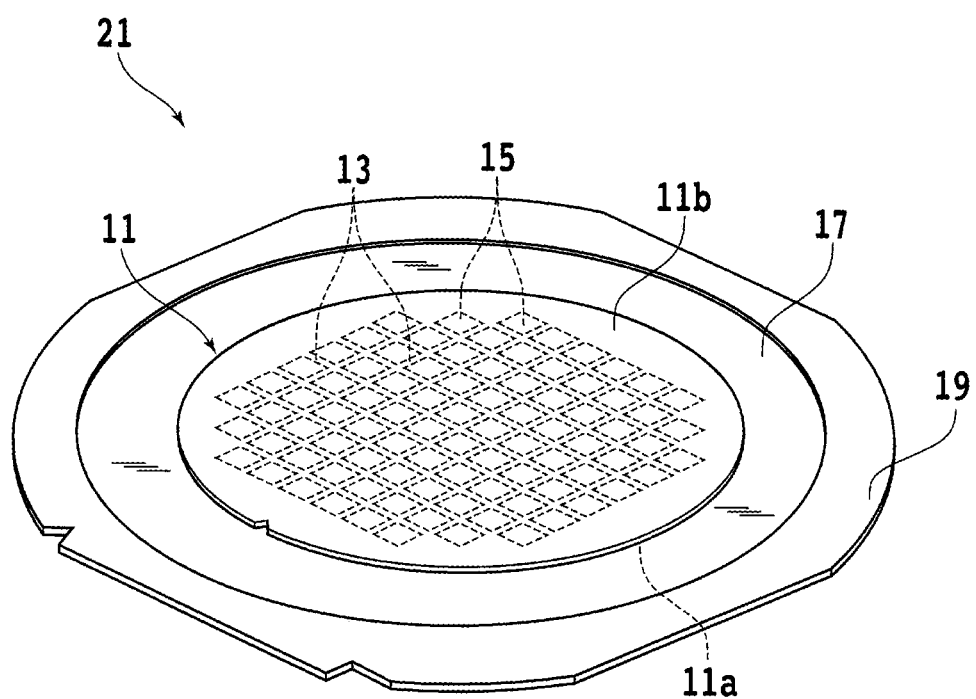
FIG. 2 is a perspective view of a workpiece unit.

The workpiece 11 is a wafer that is composed of a semiconductor material such as silicon and has a circular disc shape (plate shape), for example. However, there is no limit on the material, shape, structure, size, and so forth of the workpiece 11. For example, it is also possible to use a substrate or the like composed of a material such as another semiconductor, ceramic, resin, or metal as the workpiece 11. As illustrated in FIG. 2, in a front surface 11a of the workpiece 11, plural planned dividing lines (streets) 13 are set in such a manner as to intersect each other. In each of plural regions marked out by the plural planned dividing lines 13, a device 15 such as an IC, an alignment mark (not illustrated), and so forth are formed. However, there is no limit on the kind, quantity, shape, structure, size, arrangement, and so forth of the devices 15.

A tape (dicing tape) 17 with a larger diameter than the workpiece 11 is stuck to the side of the front surface 11a of the workpiece 11. The tape 17 is formed of a transparent material through which visible light is transmitted. The tape 17 has a layer-stacking structure with a base layer and an adhesive layer (glue layer), for example. The base layer is formed of polyolefin (PO) or the like, for example. The adhesive layer is formed of an adhesive resin such as an ultraviolet (UV)-curable acrylic resin, for example. The adhesive layer side of the tape 17 is stuck to the side of the front surface 11a of the workpiece 11. An annular frame 19 formed of a metal is fixed to the peripheral part of the tape 17. The workpiece 11 is housed in the cassette 6 in the state of a workpiece unit 21 supported by the frame 19 through the tape 17. FIG. 2 is a perspective view of the workpiece unit 21.

Figure 3:
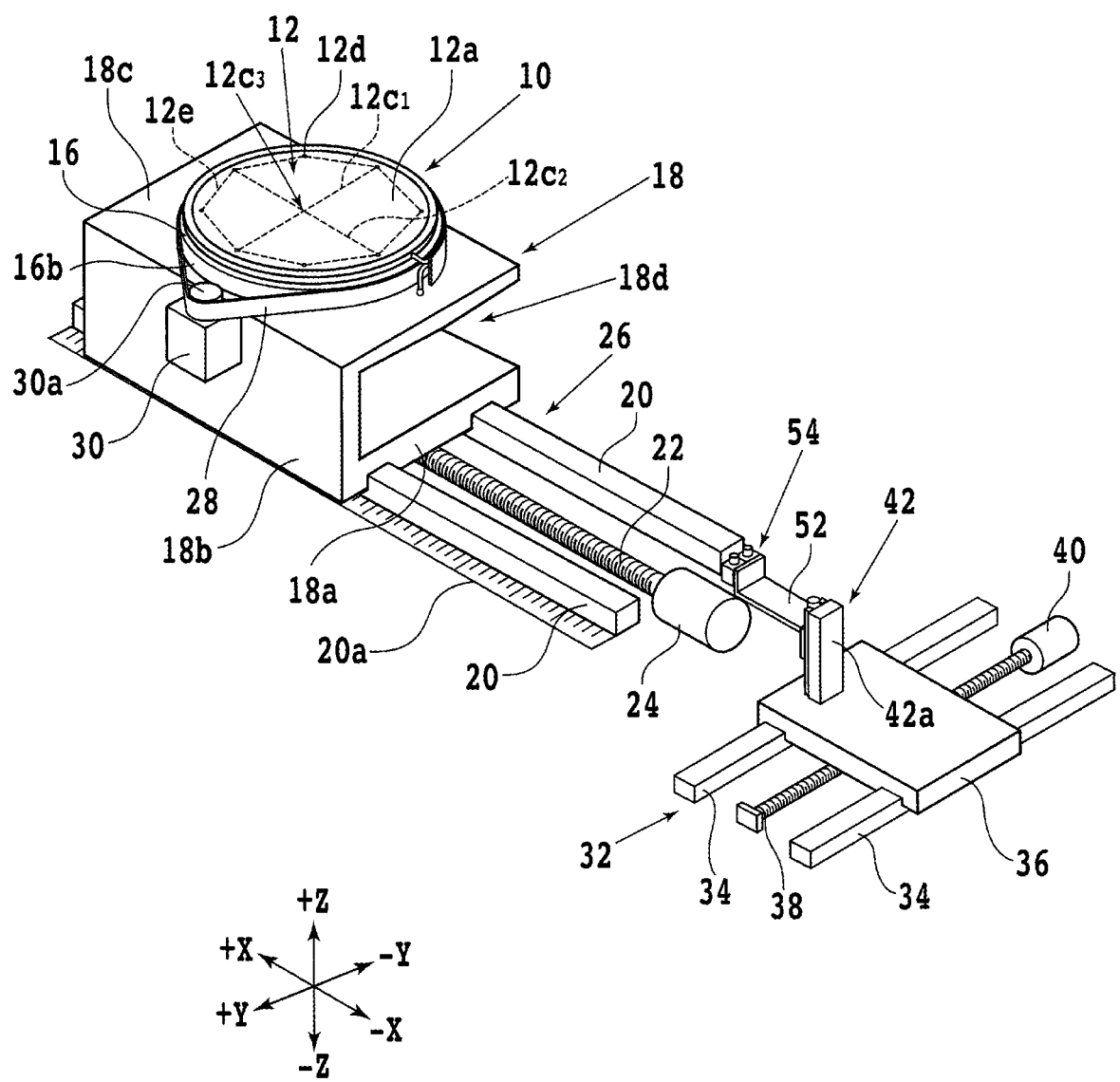
FIG. 3 is a perspective view of a chuck table and so forth.
Figure 4:
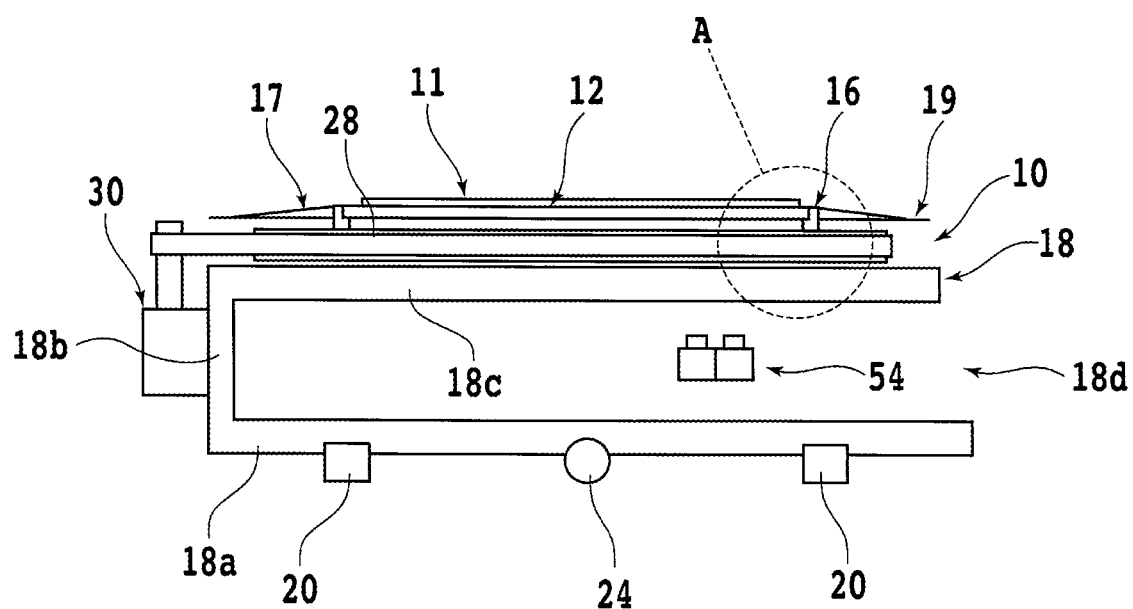
FIG. 4 is a partial sectional side view of the chuck table and so forth.
Figure 4:
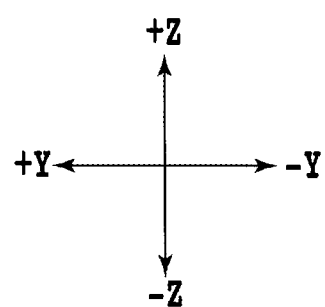
Figure 5:
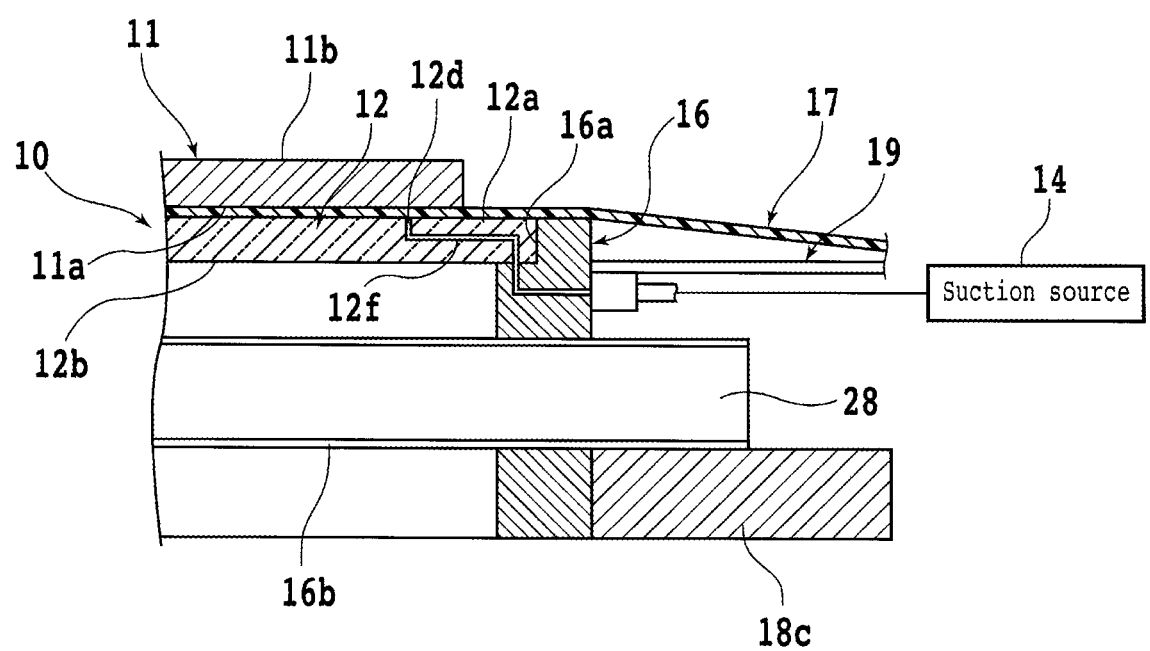
FIG. 5 is an enlarged view of region A in FIG. 4.

As illustrated in FIG. 1, an opening 4b that is long in the X-axis direction is formed on the rear side (−Y direction) of the opening 4a. A chuck table 10 with a circular disc shape is disposed in the opening 4b. A circular annular frame suction plate (not illustrated) in which suction ports are discretely formed along the circumferential direction is disposed at the peripheral part of the chuck table 10. Here, the chuck table 10 and so forth will be described in more detail with reference to FIG. 3 to FIG. 5. FIG. 3 is a perspective view of the chuck table 10 and so forth. FIG. 4 is a partial sectional side view of the chuck table 10 and so forth. In FIG. 4, hatching is omitted for convenience. FIG. 5 is an enlarged view of region A in FIG. 4. In FIG. 5, part of constituent is illustrated as a functional block diagram.

The chuck table 10 has a holding component 12 with a circular disc shape (plate shape). The holding component 12 includes substantially flat one surface 12a and the other surface 12b (see FIG. 5) located on the opposite side to the one surface 12a. The holding component 12 is formed of a transparent material through which visible light is transmitted, such as soda glass, borosilicate glass, or quartz glass. Plural flow paths are formed inside the holding component 12. Inside the holding component 12 of the present embodiment, a first suction path $12c_1$ with a straight line shape is formed in such a manner as to traverse a center axis of the circular disc when the holding component 12 is viewed from the top. Further, a second suction path $12c_2$ with a straight line shape is formed in such a manner as to be orthogonal to the first suction path $12c_1$ in the XY-plane direction.

The first suction path $12c_1$ and the second suction path $12c_2$ intersect at a point $12c_3$ located at the center axis of the circular disc and connect to each other. At the peripheral part of the one surface $12a$, plural opening parts $12d$ are formed separately from each other in the circumferential direction. Each opening part $12d$ is formed from the one surface $12a$ to a predetermined depth that does not reach the other surface $12b$. The opening part $12d$ is formed at each of both end parts of the first suction path $12c_1$ and both end parts of the second suction path $12c_2$. The respective opening parts $12d$ are connected in the circumferential direction by a peripheral suction path $12e$ formed at a predetermined depth at the peripheral part of the holding component 12.

A suction path $12f$ that extends in the radial direction is formed on the peripheral side of the opening part $12d$, and a suction source 14 such as an ejector is connected to the suction path $12f$ (see FIG. 5). When the suction source 14 is operated to generate a negative pressure, the negative pressure is generated at the opening parts $12d$. Therefore, the one surface $12a$ functions as a holding surface that holds the workpiece unit 21 (workpiece 11) under suction. Incidentally, part of incident light is scattered or reflected at the flow paths of the holding component 12, such as the first suction path $12c_1$, the second suction path $12c_2$, the opening parts $12d$, the peripheral suction path $12e$, and the suction path $12f$. Therefore, when being viewed from the one surface $12a$ or the other surface $12b$, the flow paths of the holding component 12 are not completely transparent to visible light and have translucency in some cases and are opaque in other cases.

However, predetermined regions excluding the flow paths in the holding component 12 are transparent from the one surface $12a$ to the other surface $12b$. For example, regions that arise from dividing into quarters by the first suction path $12c_1$ and the second suction path $12c_2$ and are located inside relative to the peripheral suction path $12e$ in the radial direction of the holding component 12 are transparent from the one surface $12a$ to the other surface $12b$. A circular cylindrical frame body 16 formed of a metal material such as stainless steel is disposed at the periphery of the holding component 12. An opening part $16a$ is formed at the upper part of the frame body 16 (see FIG. 5), and the holding component 12 is disposed to close the opening part $16a$.

As illustrated in FIG. 3 and FIG. 4, the frame body 16 is supported by an X-axis moving table 18. The X-axis moving table 18 includes a bottom plate $18a$ having a rectangular shape as the shape as viewed from the Z-axis direction. The lower end of a side plate $18b$ having a rectangular shape as the shape as viewed from the Y-axis direction is connected to one end of the bottom plate $18a$ on the front side (+Y direction). One end on the front side in a top plate $18c$ having the same rectangular shape as the bottom plate $18a$ as the shape as viewed from the Z-axis direction is connected to the upper end of the side plate $18b$. A space $18d$ in which one end on the rear side (−Y direction) and both ends in the X-axis direction are opened is formed between the bottom plate $18a$ and the top plate $18c$.

On the lower side (−Z direction) of the bottom plate $18a$, a pair of X-axis guide rails 20 substantially parallel to the X-axis direction are disposed in such a manner that the bottom plate $18a$ is slidable thereon. The pair of X-axis guide rails 20 are fixed to the upper surface of a stationary base (not illustrated). An X-axis linear scale $20a$ used in detection of the position of the X-axis moving table 18 in the X-axis direction is disposed at a position adjacent to the X-axis guide rail 20. Further, a reading head (not illustrated) is disposed on the lower surface side of the X-axis moving table 18.

At the time of movement of the X-axis moving table 18, the position (coordinate) of the X-axis moving table 18 in the X-axis direction and the amount of movement thereof in the X-axis direction are calculated by detecting the graduation of the X-axis linear scale $20a$ by the reading head. A nut part (not illustrated) is disposed on the lower surface side of the bottom plate $18a$ of the X-axis moving table 18, and an X-axis ball screw 22 substantially parallel to the X-axis guide rails 20 is rotatably joined to this nut part.

An X-axis pulse motor 24 is joined to one end part of the X-axis ball screw 22. When the X-axis ball screw 22 is rotated by the X-axis pulse motor 24, the X-axis moving table 18 moves in the X-axis direction along the X-axis guide rails 20. The X-axis guide rails 20, the X-axis ball screw 22, the X-axis pulse motor 24, and so forth configure an X-axis movement mechanism 26 that moves the X-axis moving table 18. On the upper surface side of the top plate $18c$ of the X-axis moving table 18, the frame body 16 is supported by the top plate $18c$ rotatably around a rotation axis substantially parallel to the Z-axis direction. The frame body 16 includes a pulley part $16b$ that is a circular cylindrical side surface. The pulley part $16b$ is located on the upper side relative to the top plate $18c$ when the frame body 16 is supported by the X-axis moving table 18.

A rotational drive source 30 such as a motor is disposed on the side plate $18b$ of the X-axis moving table 18. A pulley $30a$ is disposed at the rotation axis of the rotational drive source 30. One rotational endless belt (belt 28) is stretched around the pulley $30a$ and the pulley part $16b$. When the rotational drive source 30 is operated to rotate the pulley $30a$, the frame body 16 rotates around the rotation axis substantially parallel to the Z-axis direction by a force transmitted through the belt 28. By controlling the rotation of the pulley $30a$, the chuck table 10 can be rotated by any angle around the rotation axis.

A Y-axis movement mechanism 32 is disposed on an extended line of the X-axis movement mechanism 26 in the X-axis direction. The Y-axis movement mechanism 32 includes a pair of Y-axis guide rails 34 substantially parallel to the Y-axis direction. The pair of Y-axis guide rails 34 are fixed to the upper surface of the stationary base (not illustrated). A Y-axis moving table 36 is slidably attached onto the Y-axis guide rails 34. A nut part (not illustrated) is disposed on the lower surface side of the Y-axis moving table 36, and a Y-axis ball screw 38 substantially parallel to the Y-axis guide rails 34 is rotatably joined to this nut part.

A Y-axis pulse motor 40 is joined to one end part of the Y-axis ball screw 38. When the Y-axis ball screw 38 is rotated by the Y-axis pulse motor 40, the Y-axis moving table 36 moves in the Y-axis direction along the Y-axis guide rails 34. A Y-axis linear scale (not illustrated) used in detection of the position of the Y-axis moving table 36 in the Y-axis direction is disposed at a position adjacent to the Y-axis guide rail 34. Further, a reading head (not illustrated) is disposed on the lower surface side of the Y-axis moving table 36.

Figure 6:
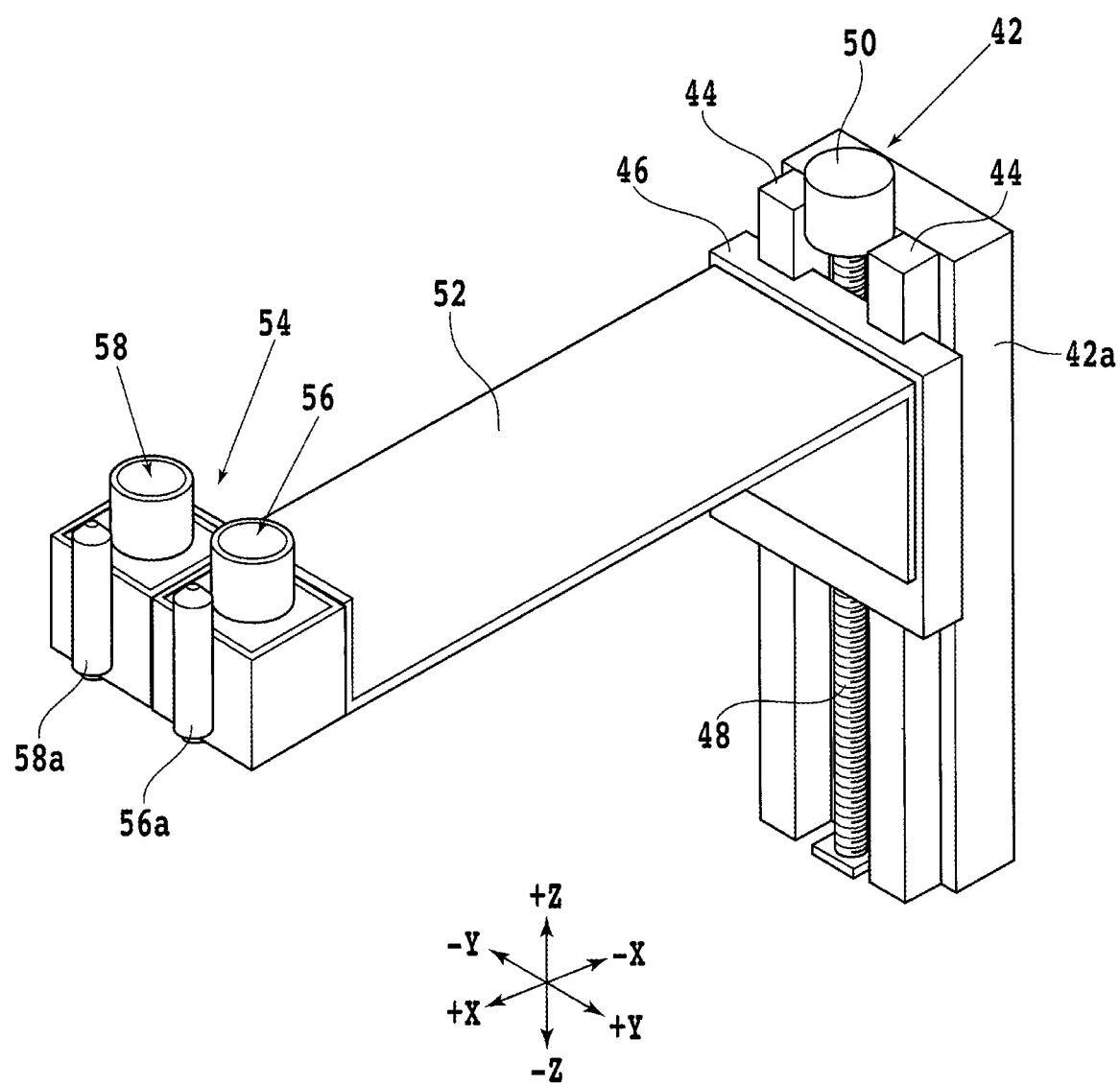
FIG. 6 is an enlarged perspective view of a Z-axis movement mechanism and so forth.

At the time of movement of the Y-axis moving table 36, the position (coordinate) of the Y-axis moving table 36 in the Y-axis direction and the amount of movement thereof in the Y-axis direction are calculated by detecting the graduation of the Y-axis linear scale by the reading head. A Z-axis movement mechanism 42 is disposed on the upper surface of the Y-axis moving table 36. FIG. 6 is an enlarged perspective view of the Z-axis movement mechanism 42 and so forth.

The Z-axis movement mechanism 42 has a support structure 42a fixed to the upper surface of the Y-axis moving table 36.

A pair of Z-axis guide rails 44 substantially parallel to the Z-axis direction are fixed to the side surface of the support structure 42a on the side of the X-axis moving table 18. A Z-axis moving plate 46 is slidably attached to the Z-axis guide rails 44. A nut part (not illustrated) is disposed on the back surface side of the Z-axis moving plate 46 (on the side of the Z-axis guide rails 44), and a Z-axis ball screw 48 substantially parallel to the Z-axis guide rails 44 is rotatably joined to this nut part.

A Z-axis pulse motor 50 is joined to one end part of the Z-axis ball screw 48. When the Z-axis ball screw 48 is rotated by the Z-axis pulse motor 50, the Z-axis moving plate 46 moves in the Z-axis direction along the Z-axis guide rails 44. A Z-axis linear scale (not illustrated) is disposed at a position adjacent to the Z-axis guide rail 44, and a reading head (not illustrated) is disposed on the Z-axis moving plate 46 on the side of the Z-axis guide rails 44. At the time of movement of the Z-axis moving plate 46, the position (coordinate) of the Z-axis moving plate 46 in the Z-axis direction and so forth are calculated by detecting the graduation of the Z-axis linear scale by the reading head.

A lower-side imaging unit (second imaging unit) 54 is fixed to the Z-axis moving plate 46 with the interposition of a support arm 52 that is long in the X-axis direction. The lower-side imaging unit 54 of the present embodiment includes a low magnification camera 56 and a high magnification camera 58. Each of the low magnification camera 56 and the high magnification camera 58 has a predetermined optical system with a collecting lens and so forth and an imaging element (second imaging element) such as a CCD image sensor or a CMOS image sensor.

The lower-side imaging unit 54 is disposed on the lower side relative to the chuck table 10 and is disposed opposed to the other surface 12b in such a manner that the optical axis of each collecting lens is substantially perpendicular to the other surface 12b of the holding component 12. An illuminating device 56a that irradiates a subject (for example, workpiece 11) located on the upper side with visible light is disposed on a lateral side of the low magnification camera 56. Similarly, an illuminating device 58a is disposed also on a lateral side of the high magnification camera 58.

In the case of imaging the workpiece 11 by the lower-side imaging unit 54, the X-axis moving table 18 is moved to the side of the Y-axis moving table 36 and the lower-side imaging unit 54 is disposed in the space 18d. Then, the workpiece 11 disposed on the side of the one surface 12a of the holding component 12 is imaged from the lower side through the holding component 12. In this manner, a normal image (i.e., image as actually seen) of the side of the front surface 11a can be acquired. The lower-side imaging unit 54 does not necessarily need to have the two cameras of the low magnification camera 56 and the high magnification camera 58. The lower-side imaging unit 54 may have only one camera with a predetermined magnification.

Here, referring back to FIG. 1, other constituents of the cutting apparatus 2 will be described. On the +X direction side and the −X direction side relative to the top plate 18c of the X-axis moving table 18, an accordion-shaped, dustproof, drip-proof cover that can freely expand and contract is attached in such a manner as to cover the opening 4b. Over the opening 4b, a gate-shaped support structure 4c is disposed to straddle the opening 4b. Two processing unit movement mechanisms (indexing feed unit, cutting-in feed unit) 60 are disposed on one side surface located on the side of the opening 4a in the side surfaces of the support structure 4c.

The respective processing unit movement mechanisms 60 share a pair of Y-axis guide rails 62 that are fixed to the one side surface of the support structure 4c and are substantially parallel to the Y-axis direction. Two Y-axis moving plates 64 are attached to the Y-axis guide rails 62 in such a manner as to be capable of sliding independently of each other. A nut part (not illustrated) is disposed on one surface of the Y-axis moving plate 64 located on the side of the support structure 4c, and a Y-axis ball screw 66 substantially parallel to the Y-axis guide rails 62 is rotatably joined to this nut part. The nut parts of the respective Y-axis moving plates 64 are joined to the different Y-axis ball screws 66.

A Y-axis pulse motor 68 is joined to one end part of each Y-axis ball screw 66. When the Y-axis ball screw 66 is rotated by the Y-axis pulse motor 68, the Y-axis moving plate 64 moves in the Y-axis direction along the Y-axis guide rails 62. A pair of Z-axis guide rails 72 substantially parallel to the Z-axis direction are each disposed on the other surface of each Y-axis moving plate 64 located on the opposite side to the support structure 4c. Z-axis moving plates 70 are slidably attached to the Z-axis guide rails 72.

A nut part (not illustrated) is disposed on one surface of the Z-axis moving plate 70 located on the side of the support structure 4c and a Z-axis ball screw 74 parallel to the Z-axis guide rails 72 is rotatably joined to this nut part. A Z-axis pulse motor 76 is joined to one end part of the Z-axis ball screw 74. When the Z-axis ball screw 74 is rotated by the Z-axis pulse motor 76, the Z-axis moving plate 70 moves in the Z-axis direction along the Z-axis guide rails 72.

Cutting units (processing units) 78 are disposed at the lower parts of the Z-axis moving plates 70. The cutting unit 78 includes a cylindrical spindle housing 80. Part of a spindle 82a (see FIG. 7) with a substantially circular column shape is rotatably housed in the spindle housing 80. A rotational drive mechanism (not illustrated) such as a motor that rotates the spindle 82a is disposed at one end part of the spindle 82a. Further, a cutting blade 82b having a circular annular cutting edge is mounted on the other end part of the spindle 82a.

Figure 7:
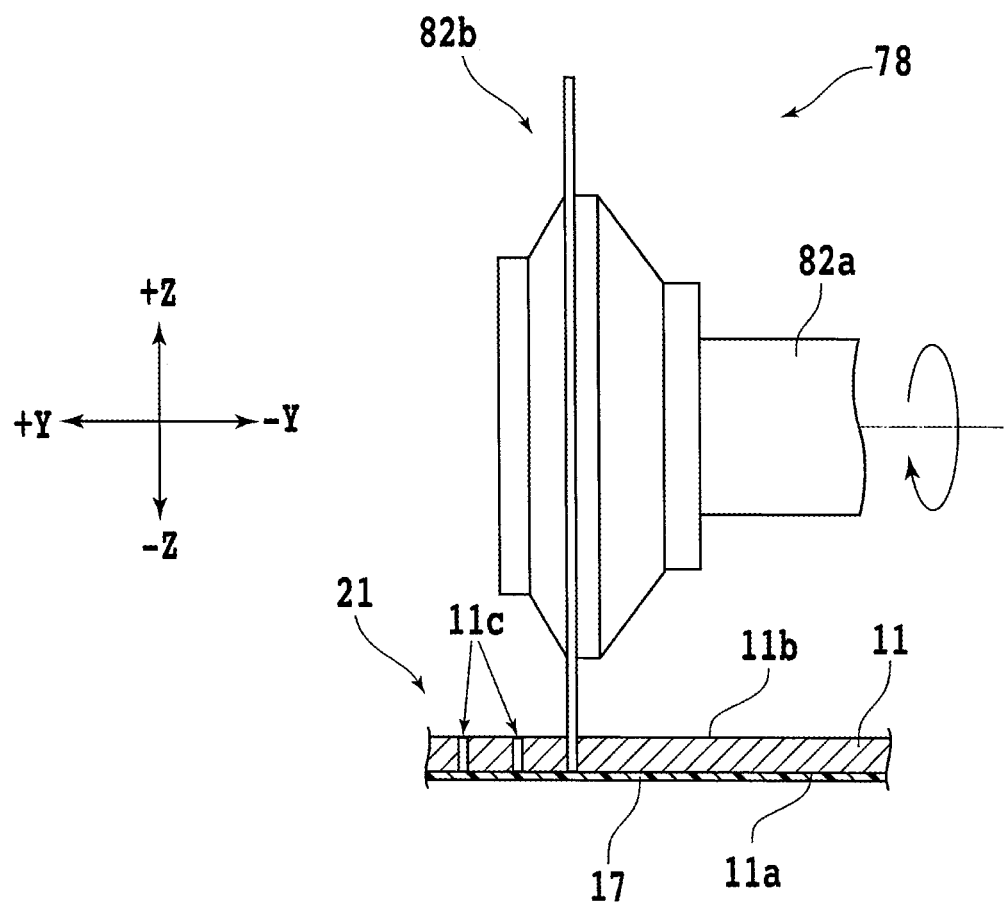
FIG. 7 is a diagram illustrating how cut grooves are formed in the workpiece.

When the workpiece 11 is cut (processed) by the cutting blade 82b, first, the front surface 11a of the workpiece 11 is held under suction by the chuck table 10, and thereafter the planned dividing lines 13 are positioned substantially in parallel to the X-axis direction. Then, the chuck table 10 is moved along the X-axis direction in the state in which the lower end of the cutting blade 82b that rotates is positioned between the front surface 11a and the one surface 12a of the holding component 12. Thereby, as illustrated in FIG. 7, the workpiece 11 is cut, and cut grooves (processed grooves) 11c are formed. FIG. 7 is a diagram illustrating how the cut grooves 11c are formed in the workpiece 11.

The cut grooves 11c of the present embodiment are what is generally called fully-cut grooves that penetrate from a back surface 11b to the front surface 11a. In some cases, the cut groove 11c is formed obliquely with respect to the thickness direction of the workpiece 11 or is formed to be tapered as the cut groove 11c progresses from the back surface 11b toward the front surface 11a. Thus, it is desired to check how the cut groove 11c is formed in the workpiece 11 on the cutting apparatus 2. In the present embodiment, the shape of the cut groove 11c is checked by using the above-described lower-side imaging unit 54 and an upper-side imaging unit (first imaging unit) 84.

The upper-side imaging units 84 are joined to the lower parts of the Z-axis moving plates 70 in such a manner as to be adjacent to the cutting unit 78. The upper-side imaging unit 84 has a predetermined optical system with a collecting lens and so forth and an imaging element (first imaging element). The upper-side imaging unit 84 is disposed over the chuck table 10 and is set opposed to the one surface 12a of the holding component 12 in such a manner that the optical axis of the collecting lens is substantially perpendicular to the one surface 12a. The upper-side imaging unit 84 images the back surface 11b of the workpiece 11 for which the side of the front surface 11a is held by the one surface 12a. In this manner, a normal image of the side of the back surface 11b can be acquired.

An opening 4d is made at a position on the opposite side to the opening 4a with respect to the opening 4b. A cleaning unit 86 for cleaning the workpiece 11 and so forth after cutting is disposed in the opening 4d. The cleaning unit 86 includes a cleaning table 88 that holds the workpiece 11 under suction and a nozzle 90 having a jet orifice disposed opposed to the cleaning table 88. A casing that is not illustrated in the diagram is disposed on the base 4, and a touch panel (display device) 92 that serves as both an input part and a display part is disposed on a side surface of the front side of the casing. On the touch panel 92, an image obtained by imaging by at least either the lower-side imaging unit 54 or the upper-side imaging unit 84, processing conditions, graphical user interface (GUI), and so forth are displayed. The input part and the display part may be separated. In this case, instead of the touch panel 92, a display device such as a video monitor or computer screen and an input device such as a keyboard and a mouse that serves as a user interface are disposed on the side surface of the front side of the casing, for example.

The cutting apparatus 2 includes a control part 94 that controls the suction source 14, the X-axis movement mechanism 26, the rotational drive source 30, the Y-axis movement mechanism 32, the Z-axis movement mechanism 42, the lower-side imaging unit 54, the processing unit movement mechanisms 60, the upper-side imaging units 84, the cutting units 78, the touch panel 92, and so forth. For example, the control part 94 is configured by a computer including a processing device such as a processor typified by a central processing unit (CPU), a main storing device such as a dynamic random access memory (DRAM), a static random access memory (SRAM), and a read only memory (ROM), and an auxiliary storing device such as a flash memory, a hard disk drive, and a solid state drive.

Software including a predetermined program is stored in the auxiliary storing device. Functions of the control part 94 are implemented by causing the processing device to operate in accordance with this software. Part of the auxiliary storing device functions as a storing device 96 that stores a program that causes the processing device to execute predetermined image processing. The processing device processes an image in accordance with this program, and thereby the image is inverted with respect to a predetermined direction. By the image processing, an image of the side of the front surface 11a is inverted in the X-axis direction (left-right inversion), for example. One example of an algorithm to invert an image in the X-axis direction will be simply described.

A consideration will be made about the case in which the coordinates of the four corners of the image are $(x_1, y_1)$, $(x_1, y_2)$, $(x_2, y_1)$, and $(x_2, y_2)$. In this case, a pixel value at the pixel of $(x_1, y_1)$ and the pixel value at the pixel of $(x_2, y_1)$ are interchanged with respect to $((x_1+x_2)/2, y_1)$. The image can be inverted with respect to the X-axis direction by executing similar operation also on pixels of other coordinates with respect to the straight line that passes through $((x_1+x_2)/2, y_1)$ and is parallel to the Y-axis. The method for image inversion is not limited to this example and another algorithm to invert an image in a predetermined direction may be employed. Further, in accordance with the above-described program, the processing device executes image processing in which feature detection is executed on an image by using a feature detection algorithm of edge detection or the like or an image is converted to a transmissive image. For example, the positions of end parts in the width direction regarding the cut groove 11c included in an image are identified by the edge detection. In the present embodiment, the shape of the cut groove 11c is checked by using the edge detection and the inversion processing.

For this purpose, first, a back surface image (first image) 23b (see FIG. 8A) is acquired by imaging a cut groove $11c_1$ formed on the side of the back surface 11b by the upper-side imaging unit 84. Subsequently, a cut groove $11c_2$ formed on the side of the front surface 11a in a region corresponding to the region imaged by the upper-side imaging unit 84 in the thickness direction of the workpiece 11 is imaged by the lower-side imaging unit 54. Thereby, a front surface image (second image) 23a (see FIG. 8B) is acquired. Thereafter, the control part 94 executes the edge detection for each image and inverts either the back surface image 23b or the front surface image 23a in a predetermined direction in such a manner that the orientations of the back surface image 23b and the front surface image 23a correspond with each other. Thereby, a superposition image 23c in which the back surface image 23b and the front surface image 23a for each of which the edge detection has been executed are superimposed is created.

Figure 8A:
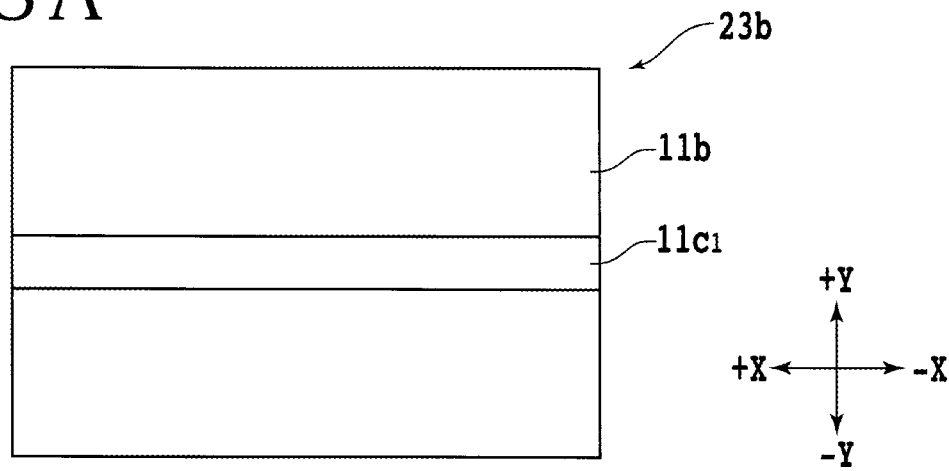
FIG. 8A is a schematic diagram illustrating one example of a first image.
Figure 8B:
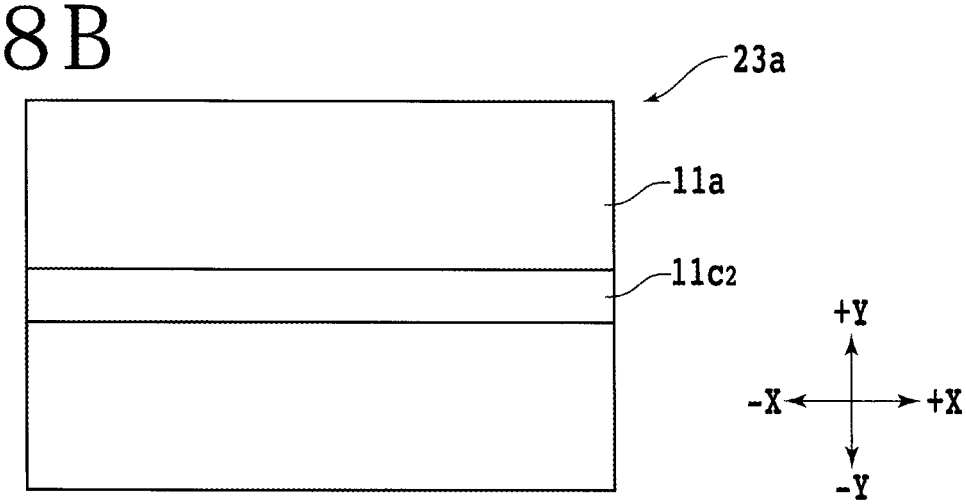
FIG. 8B is a schematic diagram illustrating one example of a second image.

For example, the control part 94 creates the superposition image 23c (see FIG. 8C) by inverting the front surface image 23a in the X-axis direction and superimposing the front surface image 23a on the back surface image 23b, and causes the touch panel 92 to display the superposition image 23c. In the superposition image 23c, both the cut groove $11c_1$ in the back surface image 23b and the cut groove $11c_2$ in the front surface image 23a (more specifically, edge parts of both) are displayed. FIG. 8A is a schematic diagram illustrating one example of the back surface image 23b, and FIG. 8B is a schematic diagram illustrating one example of the front surface image 23a. Further, FIG. 8C is a schematic diagram illustrating one example of the superposition image 23c.

Figure 8C:
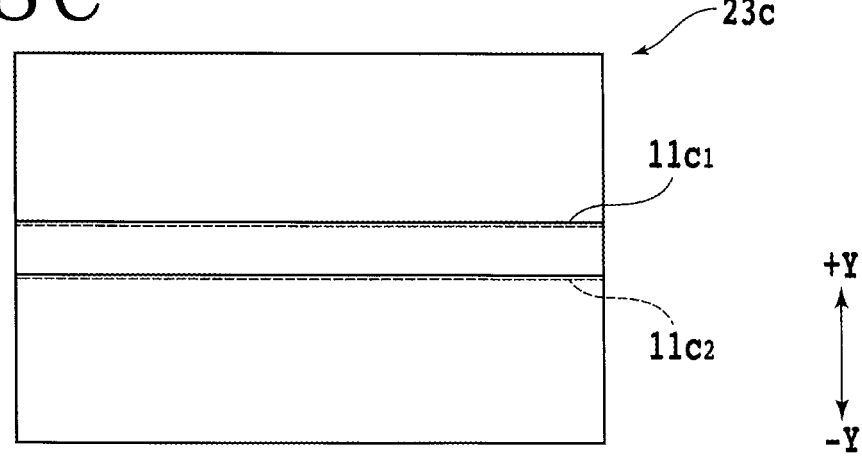
FIG. 8C is a schematic diagram illustrating one example of a superposition image.
Figure 9:
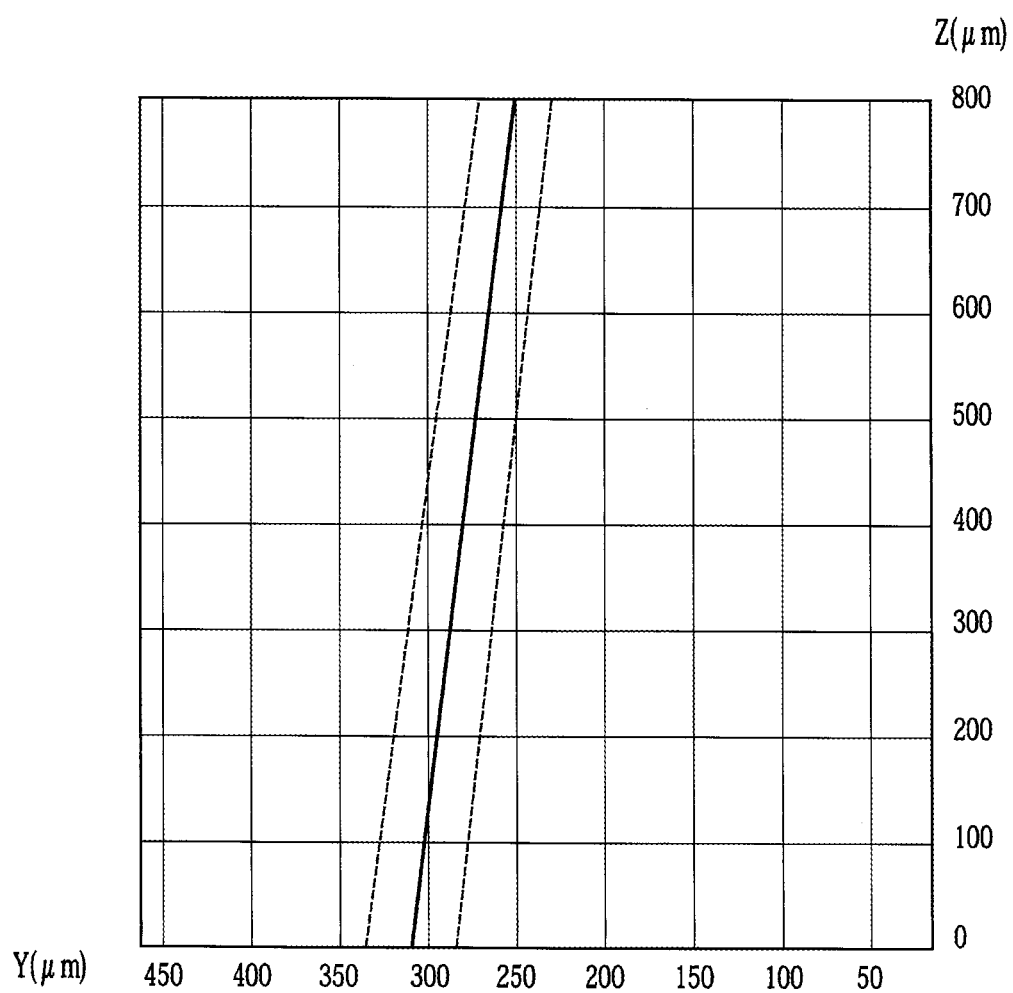
FIG. 9 is a graph illustrating a section profile of the cut groove corresponding to FIG. 8C.

In the example illustrated in FIG. 8C, the position of the center of the cut groove 11c deviates between the back surface 11b and the front surface 11a. Thus, what is generally called oblique cutting has occurred. FIG. 9 is a graph illustrating a section profile of the cut groove 11c corresponding to FIG. 8C. The graph illustrated in FIG. 9 is created by simulation based on FIG. 8A and FIG. 8B. In FIG. 9, dashed lines indicate the positions of the edges of the cut groove 11c, and a solid line indicates the position of the center of the cut groove 11c. Further, the ordinate axis indicates the thickness of the workpiece 11. The height position of the front surface 11a corresponds to $z=0$ (μm), and the height position of the back surface 11b corresponds to $z=800$ (μm). Further, the abscissa axis indicates the position in the Y-axis direction.

An operator can check the processing accuracy of the cut groove 11c by checking the position of the cut groove $11c_1$ on the side of the back surface 11b and the position of the cut groove $11c_2$ on the side of the front surface 11a with the superposition image 23c displayed on the touch panel 92. Therefore, when the cutting apparatus 2 is used, there is no need to take out the workpiece 11 in which the cut groove 11c is formed from the cutting apparatus 2 and convey the workpiece 11 to a microscope and visually inspect the workpiece 11 by the microscope. Further, because the processing accuracy can be checked on the cutting apparatus 2, the work efficiency can be improved compared with the case in which the workpiece 11 is taken out from the cutting apparatus 2 and visual inspection is executed by the microscope.

The control part 94 may invert the back surface image 23b in the X-axis direction instead of the front surface image 23a. Further, the control part 94 may create the superposition image 23c by superimposing the back surface image 23b on the front surface image 23a. Incidentally, the front surface image 23a may include the device 15, an alignment mark, and so forth in addition to the cut groove 11c. Further, the control part 94 may create the superposition image 23c by using transmissive image conversion processing and inversion processing. After the inversion processing is executed as appropriate, the superposition image 23c may be created by superimposing the front surface image 23a in a semi-transmissive state on the back surface image 23b, or the superposition image 23c may be created by superimposing the back surface image 23b in a semi-transmissive state on the front surface image 23a.

Next, a processing method of the workpiece 11 will be described. First, the workpiece unit 21 is placed on the one surface 12a of the chuck table 10 in such a manner that the side of the back surface 11b is exposed upward (placement step S10). After the placement step S10, the suction source 14 is operated to hold the side of the front surface 11a of the workpiece 11 by the one surface 12a with the interposition of the tape 17 and hold the frame 19 by the frame suction plate (not illustrated) (holding step S20). After the holding step S20, a teaching step S30 is executed.

In the teaching step S30, for example, the side of the front surface 11a is imaged by using the lower-side imaging unit 54. Then, in the state in which an image obtained by converting the taken image to a mirror image is displayed on the touch panel 92 on a real time basis, the operator searches for an alignment mark (not illustrated) on the side of the front surface 11a. After the desired alignment mark is found, an image of the side of the front surface 11a including this alignment mark is acquired by the lower-side imaging unit 54. The shape, coordinates, and so forth of the alignment mark are stored in, for example, the storing device 96 as a template of pattern matching. Further, the distance between the alignment mark and the center line of the planned dividing line 13 and the distance between two planned dividing lines 13 adjacent in the Y-axis direction (street pitch) are stored in the storing device 96. The respective coordinates stored are XY-coordinates defined with the above-described point $12c_3$ being the origin.

After the teaching step S30, alignment of the workpiece 11 is executed (alignment step S40). Also in the alignment step S40, the operator executes operation in the state in which an image obtained by converting a normal image of the side of the front surface 11a acquired by the lower-side imaging unit 54 to a mirror image is displayed on the touch panel 92 on a real time basis. In the alignment step S40, first, images of the side of the front surface 11a are acquired by using the lower-side imaging unit 54 at plural places separate from each other in one planned dividing line 13 along the X-axis direction.

Then, in the images of the side of the front surface 11a acquired at the plural places, the same pattern as the alignment mark stored as the template is detected by predetermined processing such as pattern matching. Based on the detected same pattern as the alignment mark, deviation of the planned dividing line 13 in the θ direction around the center axis of the holding component 12 is identified. Thereafter, the rotational drive source 30 is operated and the belt 28 is rotated by a predetermined amount to correct the deviation of the planned dividing line 13 in the θ direction. Thereby, the planned dividing line 13 is positioned substantially in parallel to the X-axis direction.

After the alignment step S40, the workpiece 11 is cut (processed) in the state in which the side of the front surface 11a is held under suction by the chuck table 10 (cutting step S50) (see FIG. 7). In the cutting step S50, first, the cutting blade 82b that is rotating at high speed is positioned on an extended line of the planned dividing line 13. At this time, the lower end of the cutting blade 82b is positioned between the front surface 11a and the one surface 12a of the holding component 12. Then, the chuck table 10 and the cutting blade 82b are relatively moved along the X-axis direction by the X-axis movement mechanism 26. Thereby, the cut groove 11c resulting from full cutting of the workpiece 11 in the thickness direction of the workpiece 11 is formed.

After the workpiece 11 is cut along the one planned dividing line 13 parallel to the X-axis direction, indexing feed of the cutting unit 78 is executed to position the cutting blade 82b on an extended line of the planned dividing line 13 adjacent in the Y-axis direction. Then, similarly, the workpiece 11 is cut along the planned dividing line 13. After the workpiece 11 is cut along all planned dividing lines 13 parallel to a first direction in this manner, the rotational drive source 30 is operated to rotate the chuck table 10 by 90 degrees. Then, a second direction orthogonal to the first direction is positioned in parallel to the X-axis direction and the workpiece 11 is cut along all planned dividing lines 13 parallel to the second direction.

Figure 10:
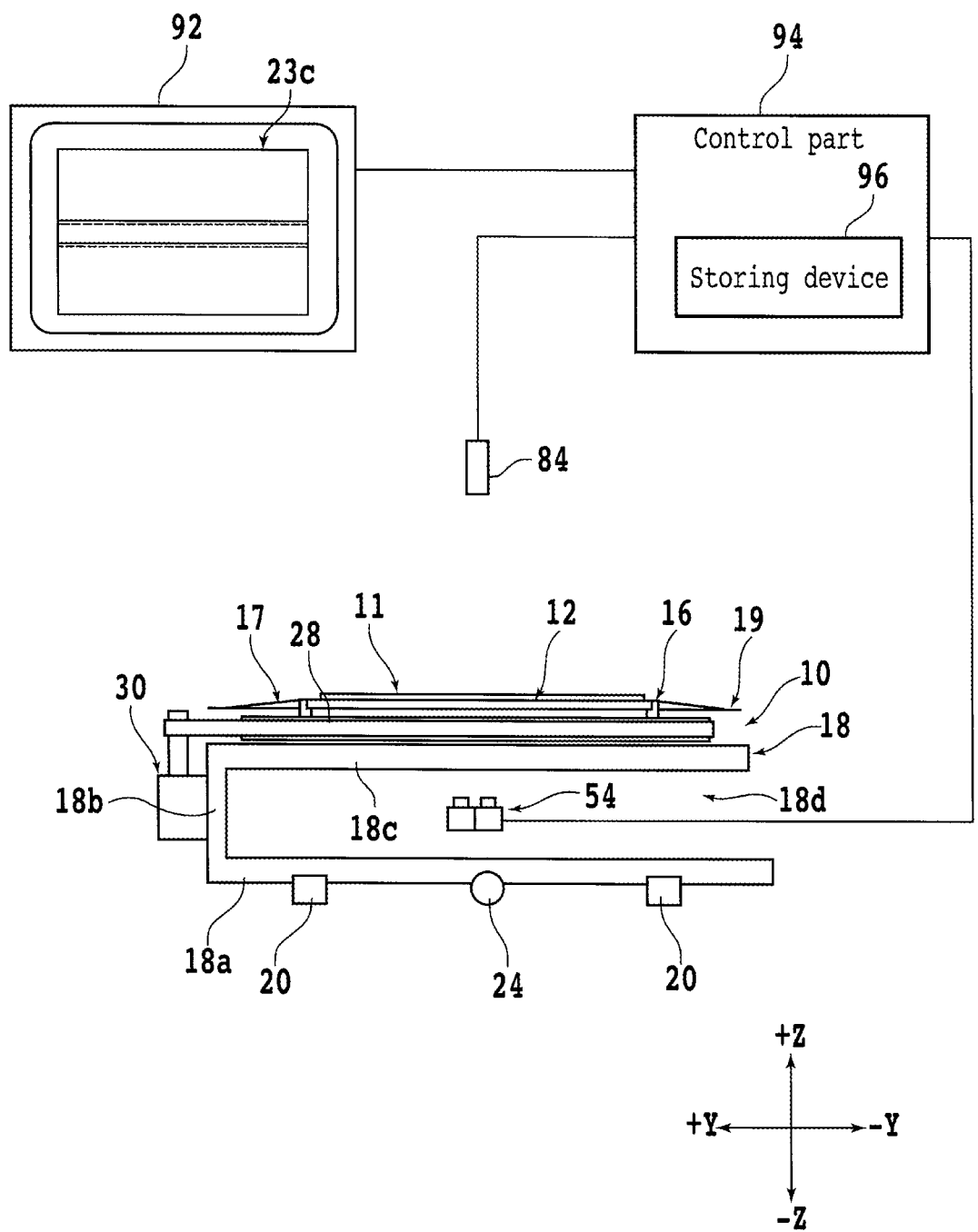
FIG. 10 is a diagram illustrating a kerf check step.

After the cutting step S50, a kerf check step S60 is executed. FIG. 10 is a diagram illustrating the kerf check step S60. In the kerf check step S60, a region on the side of the back surface 11b including the cut groove 11c and a region on the side of the front surface 11a mutually corresponding to this region in the thickness direction of the workpiece 11 are imaged. Then, the touch panel 92 is caused to display the superposition image 23c obtained by inverting either the back surface image 23b or the front surface image 23a in a predetermined direction and superimposing both. This allows the operator to check the processing accuracy of the cut groove 11c by checking the position of the cut groove $11c_1$ on the side of the back surface 11b and the position of the cut groove $11c_2$ on the side of the front surface 11a with the superposition image 23c displayed on the touch panel 92. In the present embodiment, the case in which the kerf check step S60 is executed after the completion of the cutting step S50 has been described. However, the kerf check step S60 may be executed in the middle of the cutting step S50 as long as the execution timing is after one or more cut grooves 11c have been formed.

Figure 11:
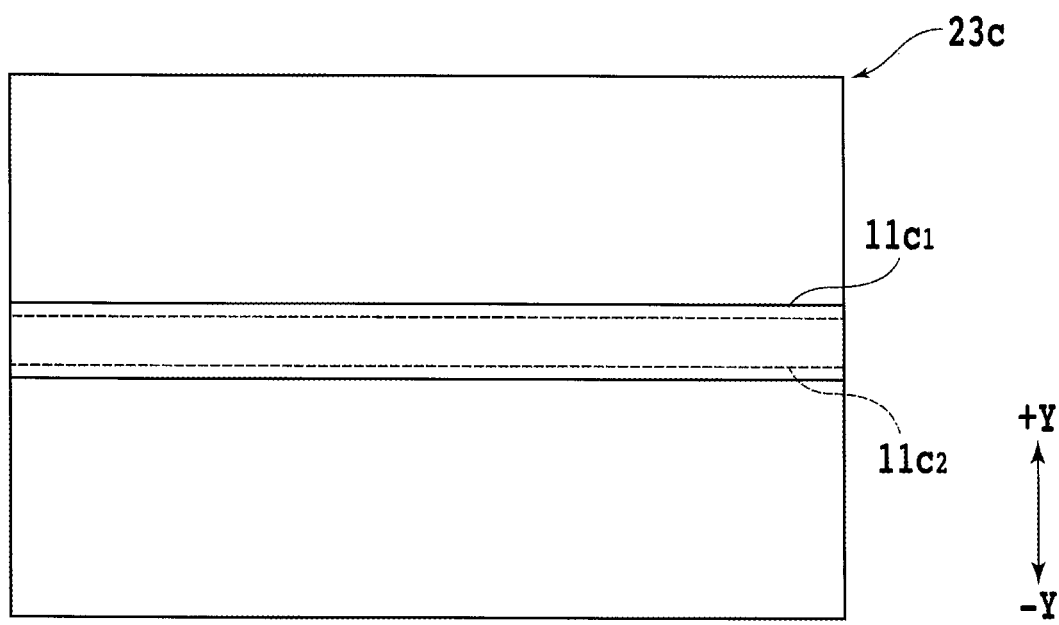
FIG. 11 is a schematic diagram illustrating another example of the superposition image obtained by superimposing the second image on the first image.

Next, a modification example of the cut groove 11c will be described. The cut groove 11c is not limited to the above-described oblique cutting and is formed to be tapered as the cut groove 11c progresses from the back surface 11b toward the front surface 11a in some cases. FIG. 11 is a schematic diagram illustrating another example of the superposition image 23c obtained by superimposing the front surface image 23a of the side of the front surface 11a on the back surface image 23b of the side of the back surface 11b when the cut groove 11c is tapered. In FIG. 11, solid lines depict the cut groove $11c_1$ of the back surface image 23b, and dashed lines depict the cut groove $11c_2$ of the front surface image 23a. Also in this modification example, the operator can check the processing accuracy of the cut groove 11c by checking the position of the cut groove $11c_1$ on the side of the back surface 11b and the position of the cut groove $11c_2$ on the side of the front surface 11a with the superposition image 23c displayed on the touch panel 92.

Figure 12:
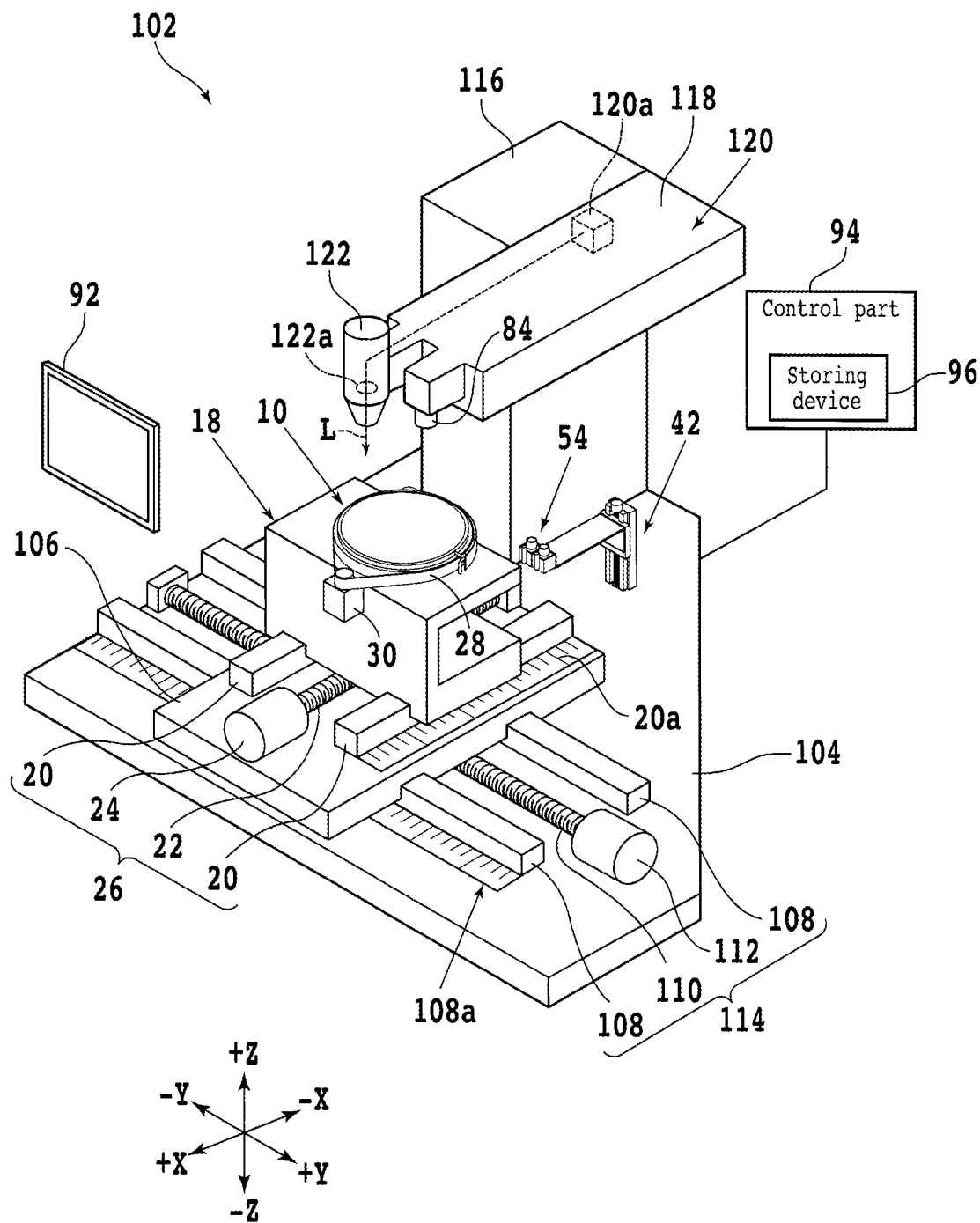
FIG. 12 is a perspective view of a laser processing apparatus.

Next, a second embodiment will be described. In the second embodiment, the workpiece 11 is processed by using a laser processing apparatus (processing apparatus) 102 instead of the cutting apparatus 2. However, the above-described placement step S10 to the alignment step S40 are executed as with the first embodiment. FIG. 12 is a perspective view of the laser processing apparatus 102 according to the second embodiment. The same constituent as the cutting apparatus 2 according to the first embodiment is given the same symbols. In the following, the difference from the cutting apparatus 2 will be mainly described.

In the laser processing apparatus 102, the lower-side imaging unit 54 is fixed to a stationary base 104. The lower-side imaging unit 54 may be disposed movably in the X-axis direction or the Y-axis direction. The X-axis moving table 18 is disposed over the stationary base 104. The X-axis moving table 18 is disposed in such a manner that the lower-side imaging unit 54 can enter the space 18d from a region located on the opposite side to the side plate 18b of the X-axis moving table 18.

The X-axis moving table 18 is slidably disposed on the pair of X-axis guide rails 20. The pair of X-axis guide rails 20 are fixed onto a Y-axis moving table 106. A nut part (not illustrated) is disposed on the lower surface side of the bottom plate 18a of the X-axis moving table 18, and the X-axis ball screw 22 substantially parallel to the X-axis guide rails 20 is rotatably joined to this nut part.

The X-axis pulse motor 24 is joined to one end part of the X-axis ball screw 22. When the X-axis ball screw 22 is rotated by the X-axis pulse motor 24, the X-axis moving table 18 moves in the X-axis direction along the X-axis guide rails 20. The Y-axis moving table 106 that supports the X-axis moving table 18 is slidably attached onto a pair of Y-axis guide rails 108 fixed to the upper surface of the stationary base 104. A Y-axis scale 108a used in detection of the position of the Y-axis moving table 106 in the Y-axis direction is disposed at a position adjacent to the Y-axis guide rail 108.

A nut part (not illustrated) is disposed on the lower surface side of the Y-axis moving table 106, and a Y-axis ball screw 110 substantially parallel to the Y-axis guide rails 108 is rotatably joined to this nut part. A Y-axis pulse motor 112 is joined to one end part of the Y-axis ball screw 110. When the Y-axis ball screw 110 is rotated by the Y-axis pulse motor 112, the Y-axis moving table 106 moves in the Y-axis direction along the Y-axis guide rails 108. The Y-axis guide rails 108, the Y-axis ball screw 110, the Y-axis pulse motor 112, and so forth configure a Y-axis movement mechanism 114 that moves the Y-axis moving table 106.

At a position adjacent to the lower-side imaging unit 54, a column 116 is disposed in such a manner as to protrude upward from the upper surface of the stationary base 104. A casing 118 having a longitudinal part substantially parallel to the X-axis direction is disposed on the column 116. At least part of a laser irradiation unit 120 is disposed in the casing 118. The laser irradiation unit 120 has a laser oscillator 120a that generates a pulsed laser beam having such a wavelength as to be absorbed by the workpiece 11 or such a wavelength as to be transmitted through the workpiece 11, and so forth.

An irradiation head 122 including a collecting lens 122a is disposed at the tip part of the laser irradiation unit 120 in the X-axis direction. The laser beam emitted from the laser oscillator 120a is collected by the collecting lens 122a, and irradiation of the lower side with the laser beam from the irradiation head 122 is executed. In FIG. 12, a laser beam L with which the lower side is irradiated from the irradiation head 122 is depicted by a dashed arrow. At the tip part of the casing 118, the above-described upper-side imaging unit 84 is disposed at a position adjacent to the irradiation head 122.

In the cutting step S50 of the second embodiment, laser-processed grooves are formed along the planned dividing lines 13 by positioning the focal point of the laser beam L to the vicinity of the back surface 11b of the workpiece 11 and relatively moving the focal point and the workpiece 11 in the X-axis direction. Then, in the kerf check step S60, similarly to the first embodiment, the operator can check the processing accuracy of the cut groove 11c by checking the respective positions of the laser-processed groove on the side of the back surface 11b and on the side of the front surface 11a with the superposition image 23c displayed on the touch panel 92.

The present invention is not limited to the details of the above described preferred embodiments. The scope of the invention is defined by the appended claim and all changes and modifications as fall within the equivalence of the scope of the claim are therefore to be embraced by the invention.

What is claimed is:

1. A processing apparatus that processes a plate-shaped workpiece in which a device is disposed in each of a plurality of regions marked out by a plurality of planned dividing lines set in a front surface of the workpiece in a state in which a side of the front surface of the workpiece is held, the processing apparatus comprising:
    a chuck table that includes one surface and an other surface located on an opposite side to the one surface, has a plate-shaped holding component having a predetermined region formed of a transparent material from the one surface to the other surface, and holds the side of the front surface of the workpiece;
    a processing unit that processes the workpiece for which the front surface is held by the chuck table and forms processed grooves in the workpiece;
    a first imaging unit that has a first imaging element, is disposed over the chuck table, and images a side of a back surface of the workpiece held by the chuck table;
    a second imaging unit that has a second imaging element, is disposed under the chuck table, and images, through the holding component, the side of the front surface of the workpiece in a region corresponding to a region imaged by the first imaging unit in a thickness direction of the workpiece;
    a display device that displays an image of the workpiece acquired by at least either the first imaging unit or the second imaging unit; and
    a control part that has a storing device in which a program to execute image processing is stored and a processing device that processes an image in accordance with the program, the control part inverting, in a predetermined direction, either a first image obtained by imaging of the processed groove formed on the side of the back surface by the first imaging unit or a second image obtained by imaging of the processed groove formed on the side of the front surface by the second imaging unit in such a manner that orientations of the first image and the second image correspond with each other, the control part causing the display device to display both the processed groove in the first image and the processed groove in the second image in a state in which the first image and the second image are superimposed.

2. The processing apparatus of claim 1, wherein the second imaging unit includes a first magnification camera and a second magnification camera, and wherein a magnification level of the first magnification camera is greater than a magnification level of the second magnification camera.

3. The processing apparatus of claim 2, wherein the second imaging unit includes at least one illumination device.

4. The processing apparatus of claim 1, wherein the second imaging unit includes at least one illumination device.

5. The processing apparatus of claim 1, further comprising a moving table configured to support the chuck table, said moving table having a top plate, a bottom plate and a side plate connected to said top plate and said bottom plate, wherein said moving table defines a space between said top plate and said bottom plate.

6. The processing apparatus of claim 5, further comprising a movement mechanism including said second imaging unit, said movement mechanism configured to move said second imaging unit through said space defined by said moving table.

* * * * *